United States Patent
Cook et al.

(10) Patent No.: US 8,706,908 B2
(45) Date of Patent: Apr. 22, 2014

(54) SYSTEM, METHOD AND APPARATUS FOR MEDIA ACCESS CONTROL (MAC) ADDRESS PROXYING

(75) Inventors: Andrew Cook, Lenexa, KS (US); Michael Morrissey, Overland Park, KS (US); Jade Kerr, Kansas City, MO (US); Mohit Mathur, Olathe, KS (US); Clinton Smoyer, Raymore, MO (US)

(73) Assignee: CenturyLink Intellectual Property LLC, Denver, CO (US)

( * ) Notice: Subject to any disclaimer, the term of this patent is extended or adjusted under 35 U.S.C. 154(b) by 952 days.

(21) Appl. No.: 12/390,097

(22) Filed: Feb. 20, 2009

(65) Prior Publication Data
US 2010/0217847 A1 Aug. 26, 2010

(51) Int. Cl.
*G06F 15/16* (2006.01)

(52) U.S. Cl.
USPC ........................................................ 709/245

(58) Field of Classification Search
USPC ........................................................ 709/245
See application file for complete search history.

(56) References Cited

U.S. PATENT DOCUMENTS

| | | | |
|---|---|---|---|
| 6,603,769 B1 * | 8/2003 | Thubert et al. | 370/401 |
| 6,934,260 B1 * | 8/2005 | Kanuri | 370/255 |
| 2002/0080755 A1 * | 6/2002 | Tasman et al. | 370/338 |
| 2002/0159459 A1 * | 10/2002 | Nagatomo et al. | 370/392 |
| 2003/0172170 A1 * | 9/2003 | Johnson et al. | 709/230 |
| 2006/0062187 A1 * | 3/2006 | Rune | 370/338 |

OTHER PUBLICATIONS

"Proxy ARP". Jan. 28, 2008: Cisco Systems, Inc. <http://www.cisco.com/application/pdf/paws/13718/5.pdf>. pp. 1-4.*
Halsall, Fred. "Computer Networking and the Internet." 2005: Pearson Education Limited. Fifth edition, pp. 362-366.*
Postel, J. "RFC 925: Multi-LAN Address Resolution." Oct. 1984: IETF Network Working Group. pp. 1-15.*
Carl-Mitchell et al. "RFC 1027: Using ARP to Implement Transparent Subnet Gateways." Oct. 1987: IETF Network Working Group. pp. 1-8.*

* cited by examiner

*Primary Examiner* — Christopher Biagini
(74) *Attorney, Agent, or Firm* — Patton Boggs LLP (57) ABSTRACT

A method for link layer address proxying includes receiving a first data packet from a first client device. The first data packet has a first source data link layer address field and a first source network layer address field. The method further includes determining a first data link layer address value associated with the first client device from the first source data link layer address field. The method further includes determining a first network layer address value associated with the first client device from the first source network layer address field, and translating the first data link layer address value into a proxy data link layer address value assigned to the first client device. The method still further includes replacing the first data link layer address value within the first source data link layer address field with the proxy data link layer address value to produce a first proxied data packet, and forwarding the first proxied data packet to a destination device.

20 Claims, 5 Drawing Sheets

SYSTEM, METHOD AND APPARATUS FOR MEDIA ACCESS CONTROL (MAC) ADDRESS PROXYING

BACKGROUND

The Media Access Control (MAC) data communication protocol sub-layer is a sub-layer of the Data Link Layer (Layer 2) specified in the seven-layer OSI model. The Data Link Layer responds to service requests from the Network Layer (Layer 3) and issues service requests to the Physical Layer (Layer 1). The MAC provides addressing and channel access control mechanisms that make it possible for several terminals or network nodes to communicate within a multipoint network, typically a local area network (LAN) or wide area network (WAN). The MAC sub-layer acts as an interface between a Logical Link Control (LLC) sub-layer of the Data Link Layer and the network's physical layer. The MAC sub-layer emulates a full-duplex logical communication channel in a multipoint network. The MAC layer addressing mechanism is called a physical address or MAC address. The MAC address is a quasi-unique identifier assigned to each network adapter, making it possible to deliver data packets to a destination within a subnetwork, such as an Ethernet. An Internet Protocol (IP) address is a Network Layer that is assigned to communication devices in a computer network utilizing the Internet Protocol for communication between its nodes.

BRIEF SUMMARY

An embodiment of a method for link layer address proxying includes receiving a first data packet from a first client device. The first data packet has a first source data link layer address field and a first source network layer address field. The method further includes determining a first data link layer address value associated with the first client device from the first source data link layer address field. The method further includes determining a first network layer address value associated with the first client device from the first source network layer address field, and translating the first data link layer address value into a proxy data link layer address value assigned to the first client device. The method still further includes replacing the first data link layer address value within the first source data link layer address field with the proxy data link layer address value to produce a first proxied data packet, and forwarding the first proxied data packet to a destination device.

An embodiment of a proxy node includes a memory, and at least one processor, the at least one processor is configured to retrieve computer-readable instructions from the memory and execute the computer-readable instructions so as to receive a first data packet from a first client device. The first data packet has a first source data link layer address field and a first source network layer address field. The at least one processor is further configured to determine a first data link layer address value associated with the first client device from the first source data link layer address field, and determine a first network layer address value associated with the first client device from the first source network layer address field. The at least one processor is further configured to translate the first data link layer address value into a proxy data link layer address value assigned to the first client device. The at least one processor is further configured to replace the first data link layer address value within the first source data link layer address field with the proxy data link layer address value to produce a first proxied data packet, and forward the first proxied data packet to a destination device.

An embodiment of a computer usable program product in a computer-readable medium stores computer executable instructions that, when executed, cause at least one processor to retrieve computer-readable instructions from the memory and execute the computer-readable instructions so as to receive a first data packet from a first client device. The first data packet has a first source data link layer address field and a first source network layer address field. The computer executable instructions further cause the at least one processor to determine a first data link layer address value associated with the first client device from the first source data link layer address field, and determine a first network layer address value associated with the first client device from the first source network layer address field. The computer executable instructions further cause the at least one processor to translate the first data link layer address value into a proxy data link layer address value assigned to the first client device. The computer executable instructions further cause the at least one processor to replace the first data link layer address value within the first source data link layer address field with the proxy data link layer address value to produce a first proxied data packet, and forward the first proxied data packet to a destination device.

BRIEF DESCRIPTION OF THE DRAWINGS

Illustrative embodiments of the present invention are described in detail below with reference to the attached drawing figures, which are incorporated by reference herein and wherein.

DETAILED DESCRIPTION

Many network devices have limited memory to store MAC addresses, and with the proliferation of Ethernet services a service provider may find that they are running out of memory for storage of MAC addresses on some network devices. IEEE Standard 802.1ah, also known as Provider Backbone Bridges (PBB), allows host MAC addresses to be encapsulated within another MAC address to reduce the number of MAC addresses that must be stored in the core network. However, IEEE 802.1ah requires that the device at each end of the communication process to understand the IEEE 802.1ah protocol so that the encapsulation can be imposed on one end and removed on the other. The encapsulation process increases the overall frame size, thus reducing throughput in the network.

One or more embodiments of the present invention allow MAC addresses associated with multiple devices to be represented to a greater network by a single MAC address. Various embodiments only require a single device, a proxy node, in the end-to-end service to perform MAC address translation and performing an encapsulation process is not necessary. In various embodiments, the proxy node performs MAC address translations without requiring an increase in frame size. In at least one embodiment, the proxy node contains a proxy table including client MAC address and client IP address mappings. The proxy table further includes a proxy MAC address assigned to each client MAC address and client IP address pair. In various embodiments, the proxy table is created either statically or dynamically. In some embodiments, the same proxy MAC address may be assigned to more than one client MAC address and client IP address pair. In at least one embodiment, the proxy node rewrites a source MAC address field of an upstream data packet send from a client device with the value of the assigned proxy MAC address, and rewrites a destination MAC address field of a downstream data packet sent to the client device containing the assigned proxy MAC address with the value of the true client MAC address. In some embodiments, if an IP address or MAC address of a data packet is not contained within the proxy table, the proxy node does not perform any proxying operations on the MAC addresses of the data packet, and the proxy node forwards the data packet with the MAC addresses unchanged to the destination.

Figure 1A:
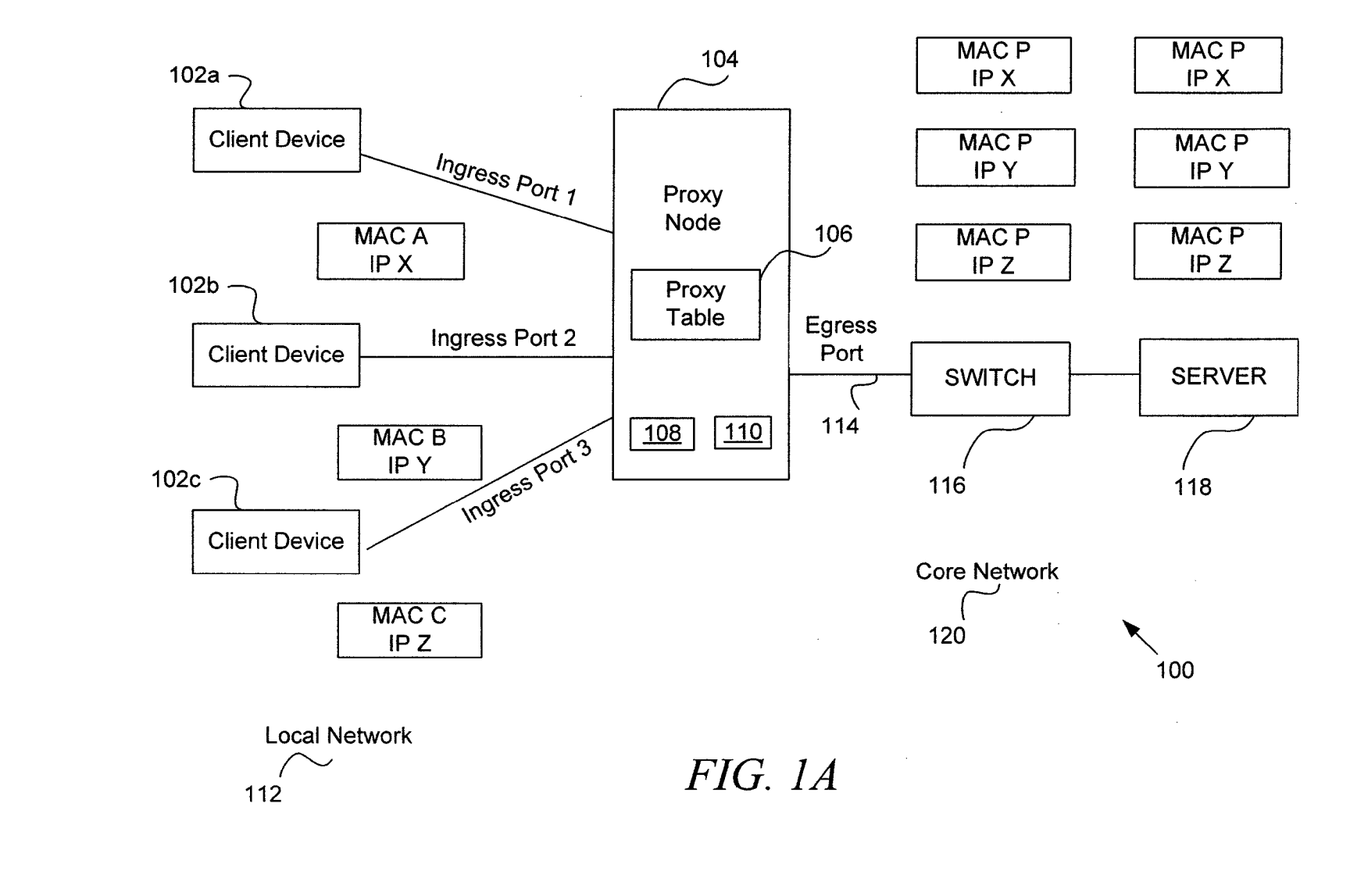
FIG. 1A is an embodiment of a system having a proxy node for MAC address proxying.

FIG. 1A is an embodiment of a system 100 for MAC address proxying. Although the embodiment described in FIG. 1 is illustrated using MAC addresses, it should be understood that in other embodiments any type of data link layer address may be used. In addition, although the embodiment described in FIG. 1 is illustrated using IP addresses, it should be understood that in other embodiments any type of network layer address may be used. The system 100 includes client device 102a, client device 102b, and client device 102c. In various embodiments, client device 102a, client device 102b, and client device 102c may include a computer, an IP phone, or any other network communication device. In an embodiment illustrated in FIG. 1A, the client device 102a has a MAC address value "MAC A" and an IP address value "IP X", the client device 102b has a MAC address value "MAC B" and an IP address value "IP Y", and the client device 102c has a MAC address value "MAC C" and an IP address value "IP Z".

The system 100 further includes a proxy node 104, switch 116, and server 118. Client device 102a is in communication with proxy node 104 via an ingress port 1 of the proxy node 104. Client device 102b is in communication with proxy node 104 via an ingress port 2 of the proxy node 104. Client device 102c is in communication with proxy node 104 via an ingress port 3 of the proxy node 104. In various embodiments, the client device 102a, client device 102b, and client device 102c are located within a local network 112. In a particular embodiment, the local network 112 is an Ethernet network. The proxy node 104 is in further communication with the switch 116 via an egress port 114 of the proxy node 104. In a particular embodiment, the switch 116 is located in a core network 120. The switch 116 is in further communication with the server 118. In a particular embodiment, the server 118 is a web server. The proxy node 104 includes a proxy table 106, a processor 108, and memory 110. In various embodiments, the proxy table 106 includes one or more client MAC address and client IP address pairs. The proxy table 106 further includes a proxy MAC address assigned to each client MAC address and client IP address pair. In various embodiments, the processor 108 is configured to retrieve computer readable instructions from the memory 110 and execute the computer readable instructions to perform various functions and operations of the proxy node 104 described herein.

Figure 1B:
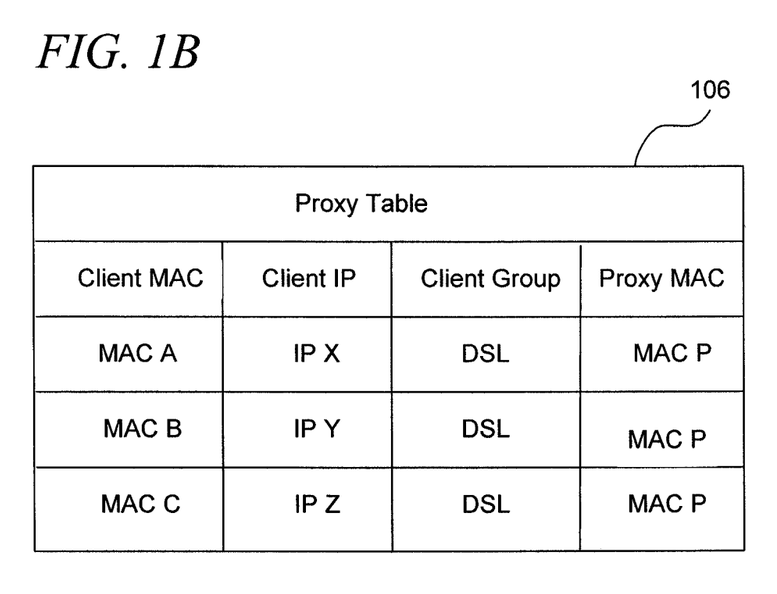
FIG. 1B is an embodiment of a proxy table of the proxy node of FIG. 1A.

FIG. 1B is an embodiment of the proxy table 106 of the proxy node 104. As illustrated in FIG. 1B, the proxy table 106 includes a client MAC address entry, a client IP address entry, a client group entry, and a proxy MAC address entry associated with each of the client devices. The client MAC address entry includes the value of a particular client device's MAC address. The client IP address entry includes the value of the same particular client device's IP address. The client group entry identifies a group of devices to which a particular client device is a member. For example, in a particular embodiment a client group entry of "DSL" may be used to indicate that the particular client device is a digital subscriber link (DSL) device. In some embodiments, the client group entry may be omitted. The proxy MAC address entry includes the particular proxy MAC address value that has been assigned to the particular client device. As illustrated in FIG. 1B, client device 102a has a client MAC address value "MAC A", a client IP address value "IP X", a client group entry "DSL", and a proxy MAC address value "MAC P". The "DSL" client group identifier identifies that the client device 102a is a DSL device. Similarly, client device 102b has a client MAC address value "MAC B", a client IP address value "IP Y", a client group identifier "DSL", and proxy MAC address value "MAC P". Client device 102c has a client MAC address value "MAC C", a client IP address value "IP Z", a client group identifier "DSL", and proxy MAC address value "MAC P". As illustrated in FIG. 1B, client device 102a, client device 102b, and client device 102c are all assigned the same proxy MAC address value of "MAC P". During proxying of MAC addresses by the proxy node 104, each of client device 102a, client device 102b, and client device 102c will be represented to the core network 120 by the same MAC address.

Figure 2:
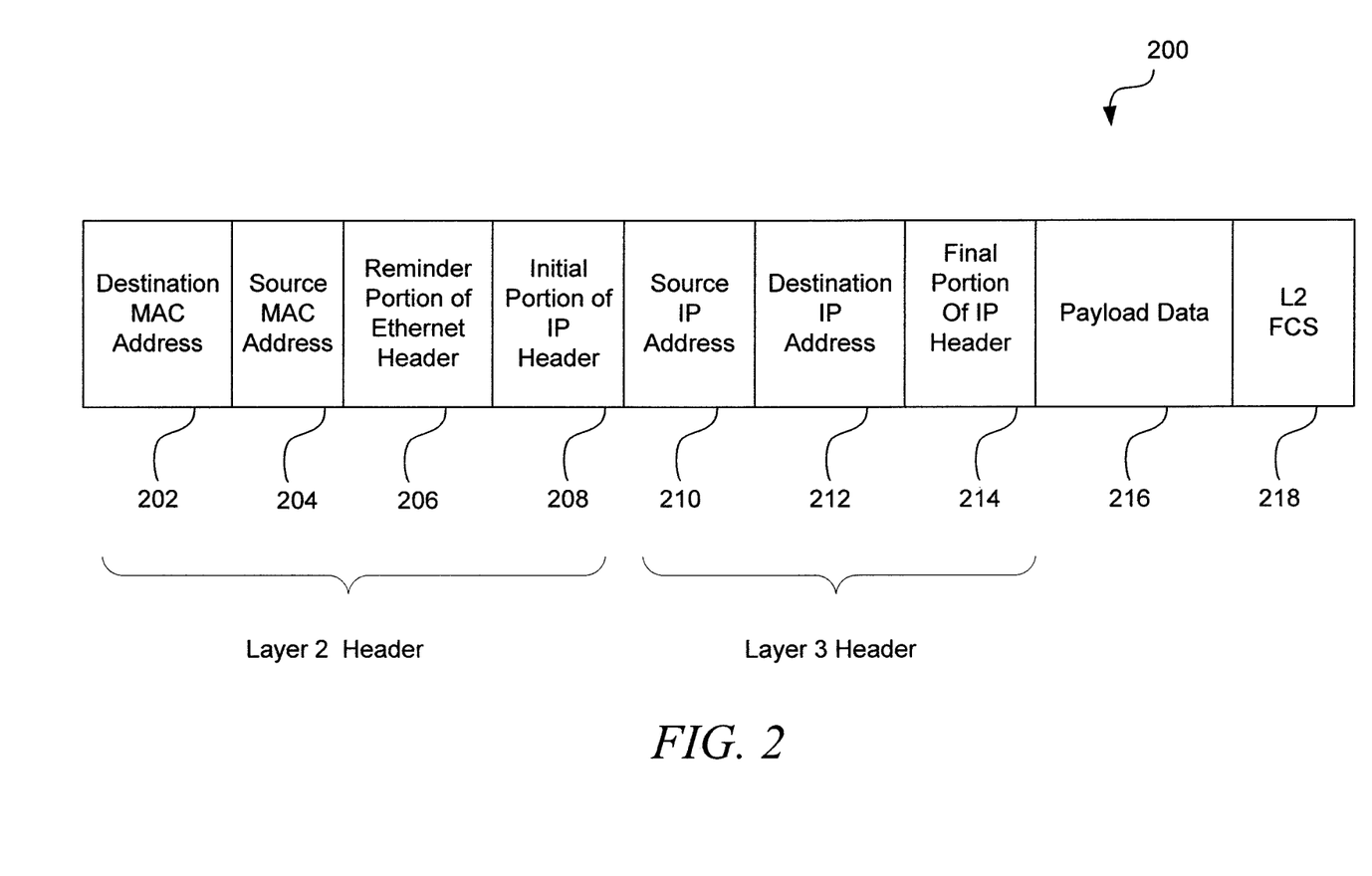
FIG. 2 is an embodiment of a data packet for transmission of information within the system of FIG. 1A.

FIG. 2 is an embodiment of a data packet 200 for transmission of information within system 100. The data packet 200 includes a Layer 2 header portion having destination MAC address field 202, source MAC address field 204, and a remainder portion of an Ethernet header 206. The destination MAC address field 202 includes a MAC address associated with the destination device to which the data packet 200 is to be sent. The source MAC address field includes the value of the MAC address associated with a sending device of the data packet 200. The data packet further includes a Layer 3 header portion having an initial portion of an IP header 208, source IP address field 210, destination IP address field 212, and a final portion of the IP header 214. The source IP address field 210 includes the value of the IP address associated with the sending device, and the destination IP address field 212 includes the value of the IP address associated with the destination device. The data packet 200 further includes payload data field 216 and a Layer 2 frame check sequence (FCS) field 218. The payload data field 216 includes the payload information of the data packet 200. The FCS field 218 includes checksum information which may be used for error detection and correction. Although the data packet 200 of FIG. 2 is illustrated as using a destination MAC address field 202 and a source MAC address field 204, it should be understood that in other embodiments any destination data link layer address field and source data link layer address field may be used. Although the data packet 200 of FIG. 2 is illustrated as using source IP address field 210 and a destination IP address field 212, it should be understood that in other embodiments any source network layer field or destination network layer address field may be used.

Referring again to FIG. 1A, an example operation of the proxy node 104 is described. In an example operation, client device 102a wishes to request information, such as a webpage, from server 118. The client device 102a sends a data packet 200 including a source MAC address value of "MAC A", a source IP address value of "IP X", and a destination IP address of the server 118. Upon receiving the data packet 200 via ingress port 1, the proxy node 104 determines the value of the source MAC address "MAC A" associated with the client device 102*a* from the source MAC address field 204. The proxy node 104 then matches the client MAC address value "MAC A" with the matching MAC address value "MAC A" in the proxy table 106. The proxy node 104 then translates the source MAC address value "MAC A" to the assigned proxy MAC address value "MAC P" in accordance with the corresponding proxy MAC address in the proxy table 106. The proxy node 104 then replaces the source MAC address value in the source MAC address field 204 with the proxy MAC address value "MAC P" to produce a proxied data packet. The proxy node 104 then sends the proxied data packet to the server 118.

The proxied data packet includes a source MAC address value of "MAC P" and a source IP address of "IP X" when it is transmitted to switch 116 and forwarded by the switch to the server 118. Similarly a data packet 200 transmitted from client device 102*b* having a source MAC address value "MAC B" and a source IP address value "IP Y" is received by the proxy node 104 and proxied to produce a proxied data packet having a source MAC address value "MAC P" and a source IP address "IP Y". A data packet 200 transmitted from client device 102*c* having a source MAC address "MAC C" and a source IP address "IP Z" is proxied by the proxy node 104 to produce a proxied data packet having a source MAC address value "MAC P" and a source IP address value "IP Z". Because data packets sent by client device 102*a*, client device 102*b*, and client device 102*c* have the same proxied MAC address value "MAC P" when proxied by proxy node 104, communication devices in the core network 120, such as switch 116, only need to store a MAC address value of "MAC P" in their MAC address table memory instead of being required to store MAC address values "MAC A", "MAC B", and "MAC C" as would be required for non-proxied data packets. As a result, substantial memory saving in MAC address tables may be achieved.

Still referring to FIG. 1A, upon the server 118 receiving the request, the server 118 sends a response back to the requesting client device, for example, client device 102*a*. The response from the server 118 includes a data packet 200 having a destination MAC address value "MAC P" and a destination IP address value "IP X". Upon receiving the data packet 200 at the proxy node 104, the proxy node 104 determines the destination IP address value "IP X" from the destination IP address field 212. Proxy node 104 then matches the client IP address value "IP X" and the client IP address entries of the proxy table 106, and determines the client MAC address value "MAC A" corresponding to the client IP address value "IP X". The proxy node 104 translates the proxy MAC value "MAC P" into the client MAC address value "MAC A". The proxy node 104 then replaces the proxy MAC value "MAC P" of the destination MAC address field 202 with the value of the client MAC address value "MAC A" to produce a non-proxied data packet. The proxy node 104 then forwards the non-proxied data packet to, the client device 102*a*.

Figure 3:
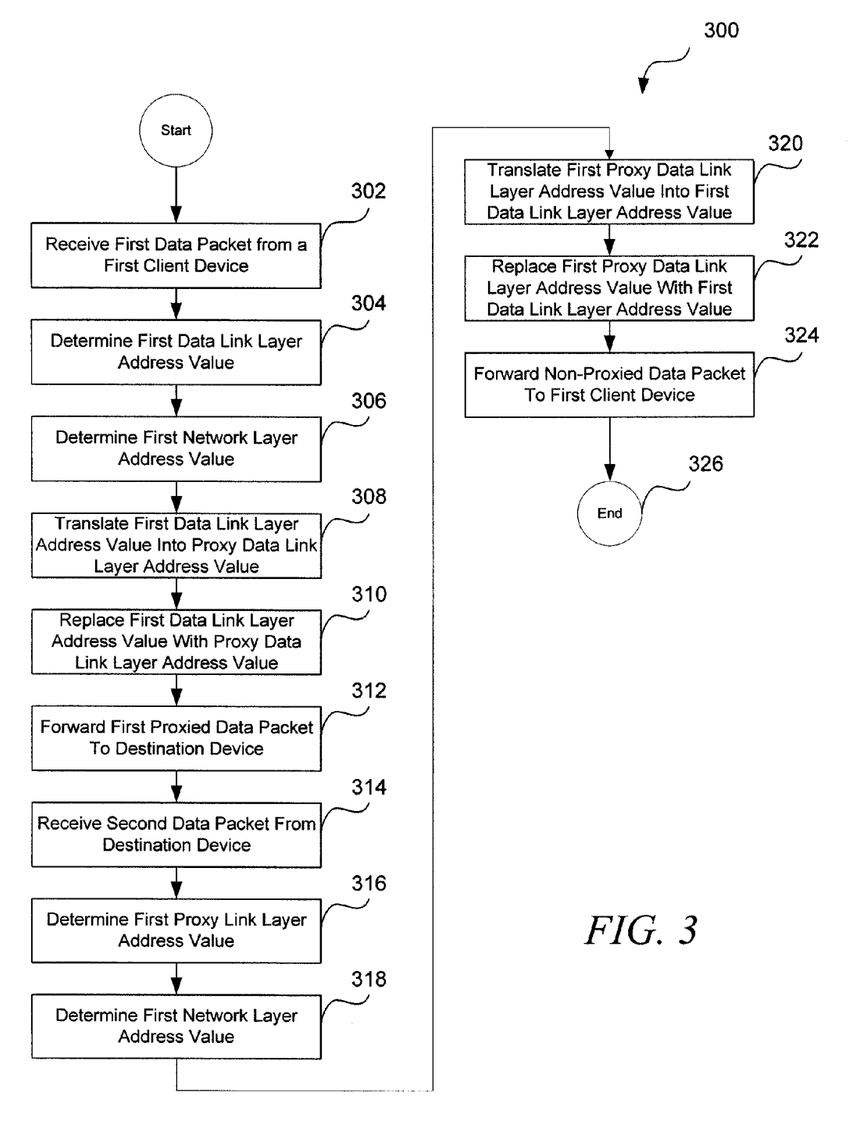
FIG. 3 is an embodiment of a procedure for link layer address proxying by the proxy node.

FIG. 3 is an embodiment of a procedure 300 for link layer address proxying by the proxy node 104. In step 302, the proxy node 104 receives a first data packet from a first client device, such as, client device 102*a*. The first data packet includes a first source data link layer address field and a first source network layer address field. In a particular embodiment, the first source data link layer address field is a source MAC address field, and the first source network layer address field is an source IP address field. In step 304, the proxy node 104 determines a first data link layer address value from the first source data link layer address field. The first data link layer address value is associated with the first client device. In step 306, the proxy node 104 determines a first network layer address value from the first, source network layer address field. The first source network layer address value is associated with the first client device. In step 308, the proxy node 104 translates the first data link layer address value into a proxy data link layer address value assigned to the first client device. In a various embodiments, the proxy node 104 matches the first data link layer address value with one of a number of first data link layer address entries in the proxy table 106, and determines the proxy data link layer address value as being equal to a proxy data link layer address value entry in the proxy table 106 corresponding to the matched first data link layer address value. In a particular embodiment, the proxy data link layer address value is a proxy MAC address value. In step 310, the proxy node 104 replaces the first data link layer address value within the first source data link layer address field with the proxy data link layer address value to produce a first proxied data packet. In step 312, the proxy node 104 forwards the first proxied data packet to a destination device, such as server 118. In various embodiments, if the first data link layer address value does not match an entry in the proxy table 106, the first data packet is forwarded to the destination device with the first source data link layer address field unchanged.

In step 314, the proxy node 104 receives a second data packet from the destination device. The second data packet has a first destination data link layer address field and a first destination network layer address field. In a particular embodiment, the first destination data link layer address field is a destination MAC address field, and the first destination network layer address field is an source IP address field. In step 316, the proxy node 104 determines the first proxy data link address value from the first destination link layer address field. In step 318, the proxy node 104 determines the first network layer address value from the first destination network layer address field. In step 320, the proxy node 104 translates the first proxy data link layer address value into the first data link layer address value based upon the first network layer address value. In a particular embodiment, the proxy node 104 matches the first network layer address value with one of a number of network layer address value entries in the proxy table 106. The proxy table 106 includes a number of data link layer address entries, each of which is associated with a corresponding network layer address entry. The proxy node 104 determines the first data link layer address value as being equal to a data link layer address entry in the proxy table 106 corresponding to the matched first network layer address.

In step 322, the proxy node 104 replaces the first proxy data link layer address value of the first destination data link layer address field with the first data link layer address value to produce a non-proxied data packet. In step 324, the proxy node 104 forwards the non-proxied data packet to the first client device. In step 326, the procedure 300 ends. In various embodiments, if the first network layer address value does not match an entry in the proxy table 106, the second data packet is forwarded to the first client device with the first destination data link layer address field of the second data packet unchanged.

Figure 4:
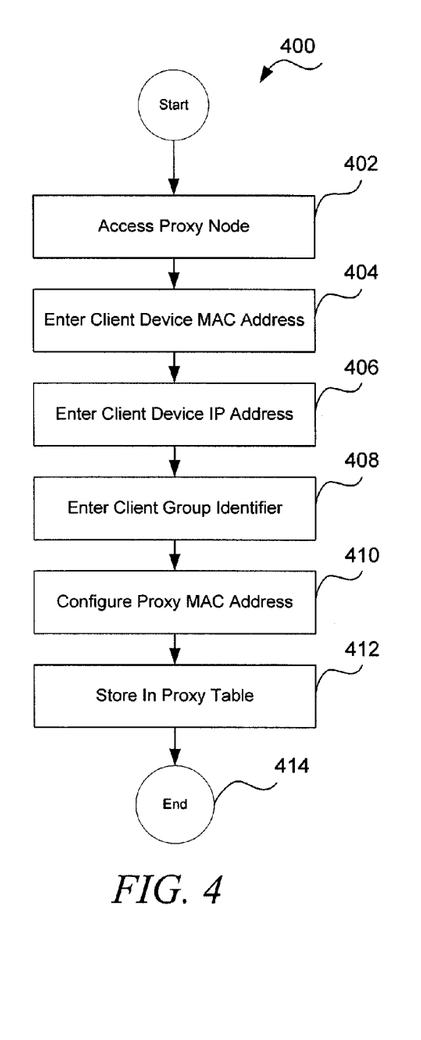
FIG. 4 is an embodiment of a procedure for static assignment of proxy MAC addresses in the proxy table.

FIG. 4 is an embodiment of a procedure 400 for static assignment of proxy MAC addresses in the proxy table 106. In step 402, an operator, such as a network operator or administrator, accesses the proxy node 104. In a particular embodiment, the operator may access the proxy node 104 via a remote terminal. In still other embodiments, the operator may access the proxy node 104 via a local access to the proxy node 104. In step 404, the operator enters a client device MAC address associated with a particular client device, such as client device 102a. In step 406, the operator enters a client device IP address associated with a particular client device. In step 408, the operator may enter a client group identifier associated with the particular client device. In still other embodiments, step 408 may be omitted. In step 410, the operator configures a proxied MAC address for the particular client device. In a particular embodiment, the operator configures the proxied MAC address by choosing a particular proxied MAC address to represent one or more client devices.

The proxied MAC address assigned to the client device may be configured based on a variety of criteria, such as an IP address range, a port from which the proxy node 104 receives data from the client device, the client group identifier, or any other criteria that may be desired. In one embodiment the operator may wish to assign every client device having an IP address within a certain IP range the same proxy MAC address value. In another embodiment, the operator may wish to assign the same proxy MAC address value to all client devices coupled to the same port of the proxy node 104 or having all client devices having the same client group identifier. In step 412, the client device MAC address, the client device IP address, the client group identifier, and the assigned proxied MAC address are stored in the proxy table 106. In step 414, the procedure 400 ends. In various embodiments, steps 404, 406, 408, 410, and 412 may be repeated for each client device that the operator wishes to add to the proxy table 106.

Figure 5:
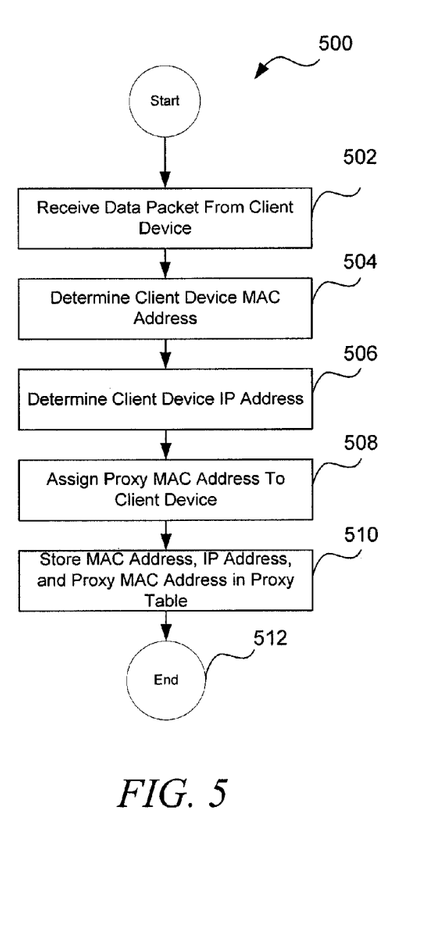
FIG. 5 is an embodiment of a procedure for dynamic assignment of proxied MAC addresses in the proxied table.

FIG. 5 is an embodiment of a procedure 500 for dynamic assignment of proxied MAC addresses in the proxied table 106. In step 502, the proxy node 104 receives a data packet 200 from a client device 102a. In one embodiment, the data packet 200 may include a request from the server 118. In step 504, the proxy node 104 determines the value of the client device MAC address from the source MAC address field 204. In step 506, the proxy node 104 determines a value of a client device IP address from the source IP address field 210. If the particular client device MAC address and client device IP address pair has not yet been assigned a proxied MAC address, the proxy node 104 assigns a proxied MAC address to the client device in step 508. In various embodiments, the proxy node 104 may assign the proxy MAC address to the client device based on a variety of criteria, such as determining whether the client device IP address falls within a certain IP range, whether the client device is in communication with a particular port of the proxy node 104, whether the client device is within a particular service group, or any other desired criteria. In still other embodiment, the proxy node 104 may be configured to reject assignment of a proxy MAC address to a particular client device based upon predefined criteria. In step 510, the proxy node 104 stores the MAC address, IP address, and proxied MAC address in the proxied table 106. In step 512, the procedure 500 ends. In various embodiments, the procedure 500 may be repeated for each client device from which data packets are received.

In alternative embodiments, the proxy node 104 may perform the proxy functions described herein in conjunction with Dynamic Host Configuration Protocol (DHCP) functions. DHCP is a protocol used by client devices to obtain various information, such as an IP address, required for operation in an Internet Protocol network. The DHCP protocol allows for dynamic assignment of IP addresses to client devices. To request assignment of an IP address, a client device broadcasts a DHCPDiscover message on the network to find an available DHCP server. When sent by the client device, the DHCPDiscover message will include a source MAC address field having a source MAC address value of the client device, as well as a CHADDR field also having the source MAC address value of the client device. In accordance with various embodiments, the proxy node 104 will receive the DHCPDiscover message from the client device and insert its own MAC address into the source MAC address field of the DHCPDiscover message, but will leave the client MAC address in the CHADDR field unchanged for accounting or DHCP services that may require the client MAC address.

In other alternative embodiments, the proxy node 104 may perform the proxy functions described herein in conjunction with Address Resolution Protocol (ARP) functions. ARP is a protocol for finding a host's link layer address, such as it's MAC address, when only its IP address or some other network layer address is known. ARP is often used to translate IP addresses to Ethernet MAC addresses. In accordance with some embodiments, the proxy node 104 will proxy an ARP request message to use the assigned proxy MAC address associated with a particular client device.

The illustrative embodiments can take the form of an entirely hardware embodiment, an entirely software embodiment, or an embodiment containing both hardware and software elements. Furthermore, the illustrative embodiments can take the form of a computer program product accessible from a computer-usable or computer-readable medium providing program code for use by or in connection with a computer or any instruction execution system. For the purposes of this description, a computer-usable or computer-readable medium can be any tangible apparatus that can contain, store, communicate, propagate, or transport the program for use by or in connection with the instruction execution system, apparatus, or device. In various embodiments, the proxy node 104 includes one or more processors operable to execute computer executable instructions from a computer-usable or computer-readable medium to perform the various capabilities of the proxy node 104 described herein.

The computer-usable or computer-readable medium can be an electronic, magnetic, optical, electromagnetic, infrared, or semiconductor system (or apparatus or device) or a propagation medium. Examples of a computer-readable medium includes a semiconductor or solid state memory, magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

Further, a computer storage medium may contain or store a computer-readable program code, such that when the computer-readable program code is executed on a computer, the execution of this computer-readable program code causes the computer to transmit another computer-readable program code over a communication link. This communication link may use a medium that is, for example, without limitation, physical, or wireless.

The previous detailed description is of a small number of embodiments for implementing the invention and is not intended to be limiting in scope. One of skill in this art will immediately envisage the methods and variations used to implement this invention in other areas than those described in detail. The following claims set forth a number of the embodiments of the invention disclosed with greater particularity.

What is claimed as new and desired to be protected by Letters Patent of the United States is:

1. A method for link layer address proxying comprising:
  receiving a first data packet from a first client device, the first data packet having a first source data link layer address field and a first source network layer address field;

determining a first data link layer address value from the first source data link layer address field, the first data link layer address value associated with the first client device;

determining a first network layer address value from the first source network layer address field, the first network layer address value associated with the first client device;

determining whether the first data link layer address value is listed in a proxy table, and if so:

translating the first data link layer address value into a proxy data link layer address value assigned to the first client device;

replacing the first data link layer address value within the first source data link layer address field with the proxy data link layer address value to produce a first proxied data packet; and forwarding the first proxied data packet to a destination device;

otherwise if the first data link layer address value is not listed in the proxy table, forwarding the first data packet unchanged to the destination device.

2. The method of claim 1 further comprising:

receiving a second data packet from the destination device, the second data packet having a first destination data link layer address field and a first destination network layer address field;

determining the proxy data link layer address value from the first destination link layer address field;

determining the first network layer address value from the first destination network layer address field;

translating the proxy data link layer address value into the first data link layer address value based upon the first network layer address value;

replacing the proxy data link layer address value of the first destination data link layer address field with the first data link layer address value to produce a non-proxied data packet; and forwarding the non-proxied data packet to the first client device.

3. The method of claim 2, wherein the translating of the proxy data link layer address into the first data link layer address further comprises:

matching the first network layer address value with one of a plurality of network layer address entries in the proxy table, the proxy table further including a plurality of data link layer address entries and, wherein each data link layer address entry is associated with a corresponding network layer address entry; and determining the first data link layer address value as equal to a data link layer address entry in the proxy table corresponding to the matched first network layer address entry.

4. The method of claim 3, wherein the proxy table further includes a plurality of proxy data link layer address entries, each proxy data link layer address entry corresponding to a network layer address entry and having an assigned proxy data link layer address value.

5. The method of claim 4, wherein a plurality of the proxy data link layer address entries of the proxy table have the same assigned proxy data link layer address value.

6. The method of claim 1, wherein the proxy data link layer address value is assigned to a plurality of client devices.

7. The method of claim 1, further comprising statically assigning the proxy data link layer address value.

8. The method of claim 1, further comprising dynamically assigning the proxy data link layer address value in response to receiving the first data packet from the first client device.

9. The method of claim 1, wherein the first data link layer address value associated with the first client device is a media access control (MAC) address associated with the first client device.

10. The method of claim 1, wherein the first network layer address value associated with the first client device is an Internet Protocol (IP) address associated with the first client device.

11. A proxy node comprising:

a memory configured to store a proxy table; and at least one processor, the at least one processor configured to retrieve computer-readable instructions from the memory and execute the computer-readable instructions so as to:

receive a first data packet from a first client device, the first data packet having a first source data link layer address field and a first source network layer address field;

determine a first data link layer address value from the first source data link layer address field, the first data link layer address value associated with the first client device;

determine a first network layer address value from the first source network layer address field, the first network layer address value associated with the first client device;

determine whether the first data link layer address value is listed in a proxy table, and if so:

translate the first data link layer address value into a proxy data link layer address value assigned to the first client device;

replace the first data link layer address value within the first source data link layer address field with the proxy data link layer address value to produce a first proxied data packet; and forward the first proxied data packet to a destination device;

otherwise, if the first data link layer address value is not listed in the proxy table, forward the first data packet unchanged to the destination device.

12. The proxy node of claim 11, wherein the at least one processor is further configured to:

receive a second data packet from the destination device, the second data packet having a first destination data link layer address field and a first destination network layer address field;

determine the proxy data link layer address value from the first destination link layer address field;

determine the first network layer address value from the first destination network layer address field;

translate the proxy data link layer address value into the first data link layer address value based upon the first network layer address value, replace the proxy data link layer address value of the first destination data link layer address field with the first data link layer address value to produce a non-proxied data packet; and forward the non-proxied data packet to the first client device.

13. The proxy node of claim 11 further comprising:

wherein the at least one processor is further configured to translate the proxy data link layer address value into the first data link layer address by:

matching the first network layer address value with one of a plurality of network layer address entries in the proxy table, the proxy table further including a plurality of data link layer address entries and, wherein each data link layer address entry is associated with a corresponding network layer address entry; and determining the first data link layer address value as equal to a data link layer address entry in the proxy table corresponding to the matched first network layer address entry.

14. The proxy node of claim 13, wherein the proxy table further includes a plurality of proxy data link layer address entries, each proxy data link layer address entry corresponding to a network layer address entry and having an assigned proxy data link layer address value.

15. The proxy node of claim 14, wherein a plurality of the proxy data link layer address entries of the proxy table have the same assigned proxy data link layer address value.

16. The proxy node of claim 11, wherein the proxy data link layer address value is assigned to a plurality of client devices.

17. The proxy node of claim 11, wherein the first data link layer address value associated with the first client device is a media access control (MAC) address associated with the first client device.

18. The proxy node of claim 11, wherein the first network layer address value associated with the first client device is an Internet Protocol (IP) address associated with the first client device.

19. A computer usable program product stored in a non-transitory computer-readable storage medium, and including computer executable instructions that, when executed, cause at least one processor to:

receive a first data packet from a first client device, the first data packet having a first source data link layer address field and a first source network layer address field;

determine a first data link layer address value from the first source data link layer address field, the first data link layer address value associated with the first client device;

determine a first network layer address value from the first source network layer address field, the first network layer address value associated with the first client device;

determine whether the first data link layer address value is listed in a proxy table, and if so:

translate the first data link layer address value into a proxy data link layer address value assigned to the first client device;

replace the first data link layer address value within the first source data link layer address field with the proxy data link layer address value to produce a first proxied data packet; and forward the first proxied data packet to a destination device;

otherwise, if the first data link layer address value is not listed in the proxy table, forward the first data packet unchanged to the destination device.

20. The computer usable program product of claim 19, further including computer executable instructions that, when executed, cause the at least one processor to:

receive a second data packet from the destination device, the second data packet having a first destination data link layer address field and a first destination network layer address field;

determine the proxy data link layer address value from the first destination link layer address field;

determine the first network layer address value from the first destination network layer address field;

translate the first proxy data link layer address value into the first data link layer address value based upon the first network layer address value;

replace the first proxy data link layer address value of the first destination data link layer address field with the first data link layer address value to produce a non-proxied data packet; and forward the non-proxied data packet to the first client device.

* * * * *